(12) United States Patent
Burch et al.

(10) Patent No.: US 7,356,689 B2
(45) Date of Patent: Apr. 8, 2008

(54) METHOD AND APPARATUS FOR TRACING PACKETS IN A COMMUNICATIONS NETWORK

(75) Inventors: Hal Joseph Burch, Pittsburgh, PA (US); William R Cheswick, Bernardsville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 936 days.

(21) Appl. No.: 09/901,286

(22) Filed: Jul. 9, 2001

(65) Prior Publication Data

US 2003/0009554 A1    Jan. 9, 2003

(51) Int. Cl.
*H04L 9/00* (2006.01)
*G06F 15/173* (2006.01)

(52) U.S. Cl. ...................... 713/153; 709/224
(58) Field of Classification Search ........... 713/200, 713/201; 709/200, 105
See application file for complete search history.

(56) References Cited

U.S. PATENT DOCUMENTS

| | | | |
|---|---|---|---|
| 5,959,974 A * | 9/1999 | Badt et al. | 370/233 |
| 6,205,122 B1 * | 3/2001 | Sharon et al. | 370/254 |
| 6,502,135 B1 * | 12/2002 | Munger et al. | 709/225 |
| 6,658,565 B1 * | 12/2003 | Gupta et al. | 713/153 |
| 6,873,600 B1 * | 3/2005 | Duffield et al. | 370/252 |
| 7,032,020 B2 * | 4/2006 | Gross | 709/224 |
| 2001/0005360 A1 * | 6/2001 | Lee et al. | 370/236 |
| 2002/0032717 A1 * | 3/2002 | Malan et al. | 709/105 |
| 2002/0032793 A1 * | 3/2002 | Malan et al. | 709/232 |

OTHER PUBLICATIONS

Stefan Savage, David Wetherall, Anna Karlin and Tom Anderson, Practical Network Support for IP Traceback, Jun. 2001, IEEE, vol. 9, Issue: 3.*
Kohei Ohta, Glenn Mansfield, yohsuke Takei, Nei Kato, Yoshiaki Nemoto, "Detection, Defense and tracking of Internet-Wide ilegal Access in a Distrbuted Manner", Jul. 2000.*
Cheswick, B., Burch, H., and Branigan S., "Mapping and Visualizing the Internet", USENIX Annual Technical Conference, Jun. 2000.
Postel, J., "RFC 791: Internet Protocol," The Internet Society, Sep. 1981.

(Continued)

*Primary Examiner*—Nasser Moazzami
*Assistant Examiner*—Brandon S Hoffman
(74) *Attorney, Agent, or Firm*—Kenneth M. Brown (57) ABSTRACT

A method for tracing packets in a communications network directed to tracing a stream of anonymous packets received at a given target host, in order to identify their source, in response, for example, to a Denial-of-Service ("DoS") attack on the target host. Advantageously, the tracing is performed without reliance on knowledge or cooperation from intervening Internet Service Providers (ISPs) along the path. The method is performed by applying a "burst load" (i.e., a brief but heavy load of transmitted packets) to various elements (i.e., links or routers) in the network and measuring the change in the rate with which the stream of packets arrive at the target. If the rate is substantially altered upon introduction of the burst load, then it may be deduced that the given element is most likely on the path from the source host of the DoS attack to the target host.

30 Claims, 2 Drawing Sheets

OTHER PUBLICATIONS

Postel, J. "RFC 768: User Datagram Protocol," The Internet Society, Aug. 1980.

Postel, J., "RFC 792: Internet Control Message Protocol," The Internet Society, Sep. 1981.

Postel, J., "RFC 864: Character Generator Protocol," The Internet Society, May 1983.

Claffy, K. "Internet measurement and data analysis: topology, workload, performance and routing statistics," NAE '99 workshop.

Cert, "Smurf IP Denial-of-Service Attacks," CERT advisory CA098.01, Jan. 1998.

Cert, "Results of the Distributed-Systems Intruder Tools Workshop", The CERT Coordination Center, Dec. 1999.

Ferguson, P. and Senie, D. "RFC 2267: Network Ingress Filtering: Defeating Denial of Service Attacks which employ IP Source Address Spoofing." The Internet Society, Jan. 1998.

Cert, "TCP SYN Flooding and IP Spoofing Attacks," CERT Advisory CA-96.21, Sep. 1996.

Cert, "IP Spoofing Attacks and Hijacked Terminal Connections," CERT Advisory CA-95.01, Jan. 1995.

\* cited by examiner

METHOD AND APPARATUS FOR TRACING PACKETS IN A COMMUNICATIONS NETWORK

FIELD OF THE INVENTION

The present invention relates generally to communications network traffic and more particularly to the analysis and tracking of packets transmitted through such communications networks.

BACKGROUND OF THE INVENTION

Advances in communications technology and the availability of powerful desktop computer hardware has increased the use of computers to access a variety of publicly available computer networks. Today, a tremendous amount of information is exchanged between individual users located around the world via public computer networks. One class of users includes private individuals and professional users interconnected via a private network, such as, for example, a corporate Internet. In addition, the Internet, an expansive international public network of computer networks, is fast becoming an important source of information, electronic communications and electronic commerce for personal computer users in homes and businesses around the world. For example, a significant amount of information is available on a network called the World Wide Web (WWW) or the "Web", which is a graphical sub-network of the Internet. Essentially, the WWW is a collection of formatted hypertext pages located in numerous computers around the world that are logically connected by the Internet. Information (i.e., content) available on the Web is displayed in the form of so-called "web pages" which are accessed by user interface programs called "web browsers".

The increased exchange of information between private and public computer networks has presented a variety of critical security issues for the protection of information on private computer networks and the overall functionality of the private computer network itself. Computer network security, at a minimum, is directed to ensuring the reliable operation of computing and networking resources, and protecting information within the network from unauthorized disclosure or access. Various security threats exist which pose increasingly difficult challenges to such network security. In particular, some of the most sophisticated types of security threats are posed by programs which exploit certain vulnerabilities within network computing systems. Such well-known software program threats either work independently (e.g., worms) to achieve their desired security breach, or require the invocation of a host program to be invoked to perform the desired disruptive actions (e.g., trapdoors, logic bombs, Trojan horses or viruses.) Indeed, there are numerous well publicized accounts of such programs being used to improperly breach the security of private computer networks and cause severe damage. Such damage has included the destruction of electronic files, alteration of databases, or the disabling of the computer network itself or computer hardware connected to the affected network.

Network administrators responsible for the operation of private computer networks employ a variety of security measures to protect the network from external security breaches such as the introduction of computer viruses. One technique uses so-called firewalls. This security scheme essentially places a separate computer system (i.e., the firewall) between the private network (e.g., a corporate Internet) and the public network (e.g., the Internet). These firewalls are software-based gateways that are typically installed to protect computers on a local area network ("LAN") from attacks by outsiders (i.e., unauthorized users). The firewall maintains control over communications from and to the private network. Essentially, the firewall imposes certain security measures on all users employing the private network. For example firewalls may block access to new Internet services or to sites on the WWW because the security consequences are unknown or not accounted for by the present firewall configuration. One potential installation configuration of a firewall is that WWW clients are prevented from contacting WWW servers directly. Typically, this proves too restrictive, and network administrators employ so-called "proxy servers". Proxy servers are designed with certain features which provide for the forwarding of requests from WWW clients through the firewall thereby providing communication flow to and from servers on the Internet.

However, network security problems are further exacerbated by the relative ease at which new host machines or new communications links can be added to access the Internet. In particular, in the context of intranets such additional new host machines and/or links can be added without consultation with the network administrator or compliance with the communications security measures on the particular Internet. As will be easily appreciated, such Internet security risks are especially catastrophic in the context of corporate intranets, which have become integral in the computing fabric of most major corporations. As such, host machines or communications channels added to the Internet that are unregistered or unrecognizable by the security shield of the network represent tremendous opportunities for so-called "attacks" by external, unauthorized parties, such as so-called "hackers". Further, there exist numerous well publicized accounts of attacks launched by hackers who have improperly breached the security of private computer networks over the Internet and caused severe damage.

For example, prevention of so-called "denial of service" ("DoS") attacks is becoming increasingly important as the use of the Internet becomes pervasive and this expansive network is strategically situated in the critical path of many commercial applications such as, for example, electronic commerce. As will be appreciated, DoS attacks are different than the security risks associated with some of the attacks discussed above (e.g. viruses), in that DoS attacks are not primarily designed to damage computer files or misappropriate an innocent party's information. Rather, DoS attacks are primarily launched to disable a particular Internet site from operating.

Essentially, DoS attacks take advantage of the inherent communications design of the Internet, and in particular, the feature that messages exchanged across the Internet are presumed valid and originating from valid sources. As such, attackers launching the DoS attack use this principle to their advantage to inundate a particular Internet site with messages, thereby overloading the site's ability to respond and disabling the site from operating. DoS attacks are characterized by a flood of packets with random. apparently valid, return addresses. However, such addresses are in fact fictitious and are generally created by a malicious program executing on an unknown host computer, and are carried by packets that have no information with respect to the actual identity of the originating host.

There are at least two well-known targets of DoS attacks, namely machine attacks and network attacks. For example, a so-called "SYN" attack (see, e.g., CERT. "TCP SYN Flooding and IP Spoofing Attacks". CERT Advisory CA 96.21, September, 1996) is a well-known type of attack against an individual machine. In such a DoS attack, a series of so-called TCP SYN packets are transmitted to a particular machine thereby causing the machine to create a larger series of half open TCP connections. Thereafter, when another computer (e.g., a client) desires to connect to the particular machine, the machine cannot locate an open slot in its table for clients due to the DoS attack. As such, the desired connection is denied by the machine. A significant problem of this type of DoS attack from a security perspective is that the clients and the attackers are basically indistinguishable. Although one possible defense for such SYN attacks in particular is described in the above-cited CERT Advisory, some machines may be more difficult to defend against such attacks.

The second known DoS attack is directed at an entire network and poses, from a security perspective, a much larger problem. In such network attacks, the objective is to overload the connection between a particular network (e.g., a corporate network) and its Internet Service Provider (ISP) with a large volume of communications traffic. More specifically, an attacker causes a large stream of data to be directed to the corporate network which causes the communications connection (i.e., the pipeline) from the company's ISP to the company to become severely congested. This congestion, in turn, results in a loss of packets being transmitted to the corporate network. In particular, in as much as the routers along the communications path to the corporate network cannot distinguish between the attacking packets and valid client packets, the routers drop packets of each type with equal probability. As such, if an attacker can transmit packets at a very rapid rate, the packet drop rate will become so high that an insufficient number of the client's packets are actually received. Thus, the corporate network does not receive adequate service, if any, from the loaded link subject to the attack. One well-known attack of this type is the so-called "smurf" attack detailed in CERT, "smurf IP Denial-of-Service Attacks", CERT Advisory CA 98.01, January, 1998.

One major obstacle to the prevention of such DoS attacks is that it is extremely difficult to determine the actual source of the attack. The attackers have the distinct advantage of being able to place almost any type of packet on the local communications connection whose source IP address is invalid and completely random. Thus, as detailed above, the victim of the attack is unable to determine the source and thereby correct the situation. To combat such network security risks from DoS attacks, network administrators typically attempt to trace the "malicious" packets back to their source. However, such tracing is often a massive, tedious and computationally intensive exercise given the size and breadth of the Internet. Typically, current approaches to such tracing (referred to in the art as "hop-by-hop" tracing) requires tedious continued attention and cooperation by third parties—e.g., by each intervening Internet Service Provider (ISP)—which must provide technical assistance and access to their networks in order to complete the desired trace. Gaining such access and cooperation from such ISPs is a major impediment in achieving a complete and accurate tracing of the source of the malicious packets, especially since the victim of the attack is unlikely to be a customer of all of the ISPs between itself and the attacker.

A need exists therefore for improving the traceability of packets in larger communications networks to identify their source, and in particular, for a method of tracing such packets which does not rely on knowledge or cooperation from intervening ISPs along the path.

SUMMARY OF THE INVENTION

In accordance with the present invention, a novel method and apparatus for tracing packets in a communications network is provided which is advantageously directed to tracing a stream of anonymous (i.e., unidentified or inaccurately identified) packets received at a given target, in order to identify their source. Advantageously, the tracing is performed without reliance on knowledge or cooperation from intervening ISPs along the path. In accordance with the principles of the present invention, the tracing method is performed by applying a "burst load" (i.e., a brief but heavy load of transmitted packets) to various elements (i.e., network links or routers) in the network and then measuring the change in the rate with which the stream of packets arrives at the target.

More particularly, and in accordance with an illustrative embodiment of the present invention, a mapping of the routes between a particular host (e.g., the target of a DoS attack—hereinafter also referred to as the "target host") and the various portions of the communications network is determined. The mapping of such routes advantageously includes the identity of a series of networks through which packets are transmitted to the host, wherein such networks include a series of routers interconnected by sets of network links. Utilizing such a route mapping, a tracing is accomplished from the target host back through the various routes to identify a path to the source of the packet stream (e.g., the source of the DoS attack).

In accordance with the principles of the present invention, tracing of the packets from the target host to the packet source is achieved by applying a burst load to one or more network elements (i.e., network links or routers), and then measuring the change in the rate with which the stream of packets arrives at the target host. If the rate is substantially altered upon introduction of the burst load, then it may be deduced that the given element is likely to be on the path from the source (e.g., the source host of the DoS attack) to the target host. If, on the other hand, little or no impact on the rate is observed, then it may be deduced that the given element is unlikely to be along the path traveled by the stream of packets. In the latter case, the given element and any networks "behind" it may advantageously be removed from consideration in the attempt to identify the source of the attack.

In accordance with an illustrative embodiment of the present invention, such tracing advantageously continues back through the network on a router-by-router basis, until a potential source of the DoS attack is identified. In this manner, identification of the attacking source may be advantageously accomplished without the knowledge, cooperation or intervention of any intervening ISPs along the network routes and may be advantageously performed directly by and within the target host's network.

DETAILED DESCRIPTION

Overview of an Illustrative Method for Tracing Packets

Figure 1:
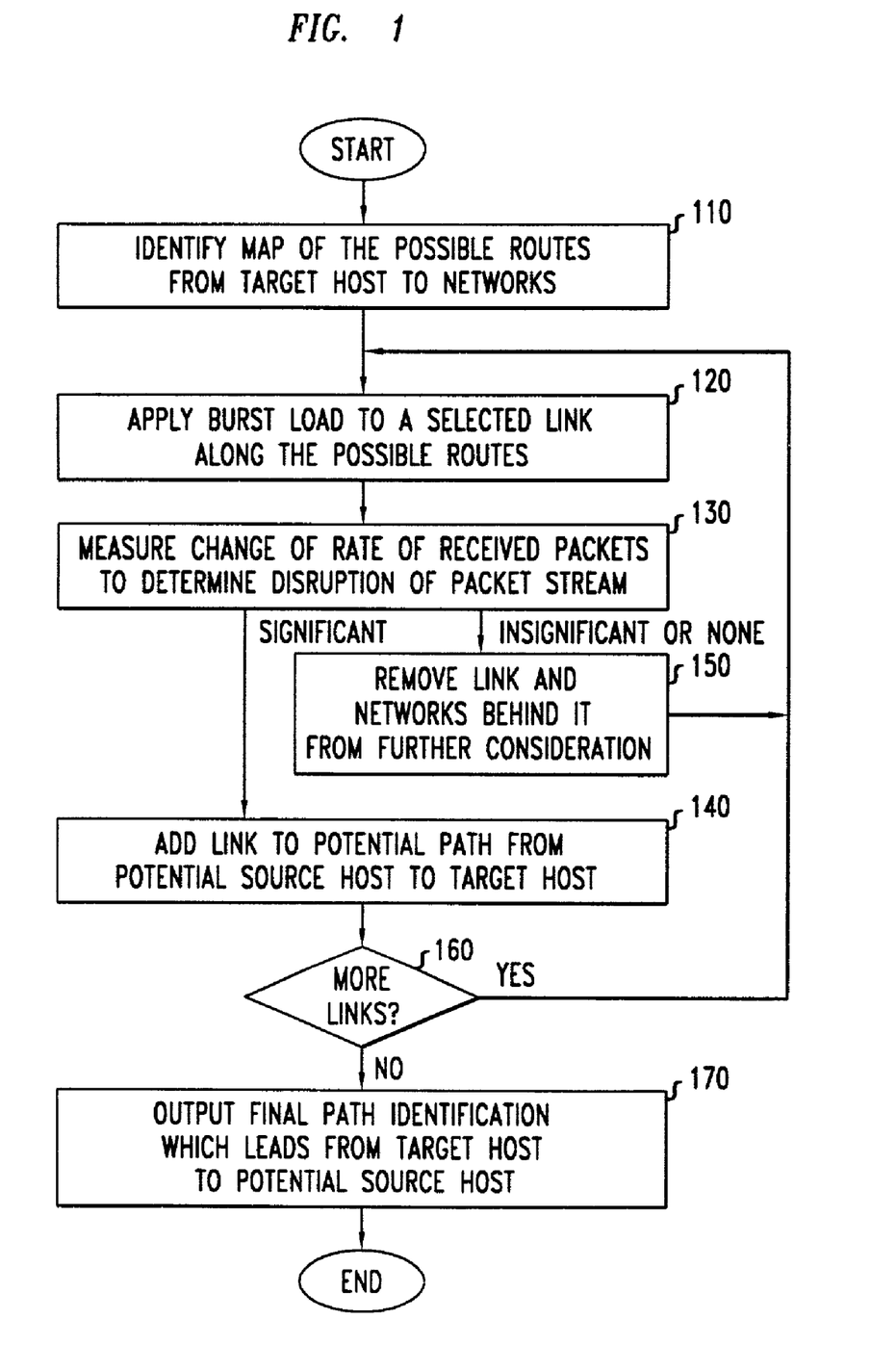
FIG. 1 shows a flowchart of a method for tracing packets in a communications network to determine their source in accordance with an illustrative embodiment of the present invention.

FIG. 1 shows a flowchart of a method for analyzing and tracing packets to determine their source in a communications network in accordance with an illustrative embodiment of the present invention. The first step of the illustrative method comprises the creation of a map of the routes which define the connections from the target host (i.e., the victim of the DoS attack) to a series of communications networks (see FIG. 1, block 110). The mapping of the routes can be accomplished by employing any number of known mapping schemes, such as, for example, the techniques described in either H. Burch et al., "Mapping and Visualizing the Internet", Proceedings of the 2000 USENIX Annual Technical Conference, 2000, or in R. Govindan et al., "Heuristics for Internet Map Discovery", Technical Report 99-717, Computer Sciences Department, University of Southern California, 1999, each of which is hereby incorporated by reference as if fully set forth herein for all purposes.

In accordance with an illustrative embodiment of the present invention, identification of the routes leads to the identification of the hosts (i.e., computers) within such communications networks. Illustratively, the identification of such hosts may be accomplished by (i) looking up so-called "announced" routes in publicly available route ownership databases to determine network ownership (i.e., ownership of the announced networks); (ii) checking for internally-announced routes that are also present in the Internet's list of announced routes; (iii) executing a conventional traceroute-like program to each announced network and collecting a listing of interior routers; and (iv) pinging the interior routers to obtain a list of routers known to each of the interior routers.

Having identified the routes and hosts (i.e., the individual links) which define the map of connections from the target host to a series of communications networks, the mapping results may be advantageously used to identify the source of the malicious packets (i.e., the DoS attack) in accordance with an illustrative embodiment of the present invention. Note that the map is essentially a directed graph representing the links between a series of communications networks and the target host. Thus, in accordance with an illustrative embodiment of the present invention, a trace-back is performed backwards—i.e., from the target host outward—through the directed graph, in order to identify the potential source of the attack.

More particularly, a so-called burst load is advantageously applied to the links along the possible routes in the mapping (see FIG. 1, block 120). Specifically, starting with the closest router (and thereafter working "backwards" through the network mapping—that is, iteratively operating on routers which are incrementally farther away from the target host), a burst load is applied to each link attached thereto. For example, and in accordance with one illustrative embodiment of the present invention, such burst loads applied to the individual links may consist of a plurality of packets illustratively generated using the well-known UDP chargen service, described, for example, in J. Postel, "RFC 864: Character Generator Protocol," The Internet Society, May, 1983.

If the loaded link is a component of the path of the attacking stream, the induced load will advantageously perturb the attacking stream. Thus, if the stream is altered when a link is loaded, this link is probably along the path from the source host of the attack to the victim host. If the strength of the stream is unperturbed by the load, it is unlikely that the stream of attacking packets is utilizing that link, so it is unnecessary to examine networks "behind" that link—that is, the given link, together with links that are comprised in the subnetwork attached to the given link but farther from the target host than that link, may all be removed from consideration as a potential source of the attack.

In accordance with an illustrative embodiment of the present invention, application of the burst load is advantageously applied under the following conditions: (1) the routes under study (e.g., the Internet) are assumed to be substantially symmetric; and (2) the DoS attack is assumed to emanate from a single host, applied at a fairly consistent rate, and lasts for a reasonable length of time (i.e., enough time such that the tracing procedure in accordance with the illustrative embodiment of the present invention may be executed to completion).

Illustratively, the packets of the burst load may advantageously be so-called "spoofed packets", fully familiar to those skilled in the art. A spoofed packet, as used herein when testing a link, is sent to the "far" end of the link using a return address of the router on the "near" end of the link. (The packet is said to be "spoofed" because the supplied originator address of the packet is false or derived—i.e., it does not originate from an actual host request.) As will be appreciated by one skilled in the art, the spoofed packets can be configured in a variety of protocols for applying the various security aspects of the present invention in a variety of network configurations.

Upon applying the burst load, a check is made to detect whether there was any disruption in the packet stream of the particular link (see FIG. 1, block 130) to which the burst load was applied. That is, as pointed out above, the link is loaded with the spoofed packet stream for the purpose of determining whether there is a noticeable resultant drop in the rate of attacking packets across the link. If a significant drop occurs, this may be advantageously interpreted as an indication that the tested link is on the path from the DoS attacker to the victim (see FIG. 1, block 140). If no significant packet drop is detected across the link, the link could not have been on this path, and so it may be removed from further consideration (see, FIG. 1, block 150) by the instant method for identifying the DoS attacker in accordance with the principles of the present invention. Moreover, as pointed out above, all networks "behind" the given link no longer need to be examined, and can thus be "pruned" from the graph.

After testing the links attached to the closest router, the illustrative method continues working back through the network—router by router—pruning branches (and the networks behind them) which when tested with the burst load do not result in a perturbation of the attack. Once all of the links have been tested (see FIG. 1, block 160)—that is, after a burst load has been applied to each link in turn and that link has been tested and either indicated as being on the attacking path or removed (i.e., "pruned") from further consideration (along with the networks behind it)—it is a straightforward matter to identify the path which traces the attack to its source (see FIG. 1, block 170). Namely, in accordance with the illustrative embodiment of the present invention, the attack source may advantageously be narrowed to one network based on the links which remain (i.e., those which have not been removed) at which point one can shift to conventional traceback methods by contacting the entity which controls the identified network.

Figure 2:
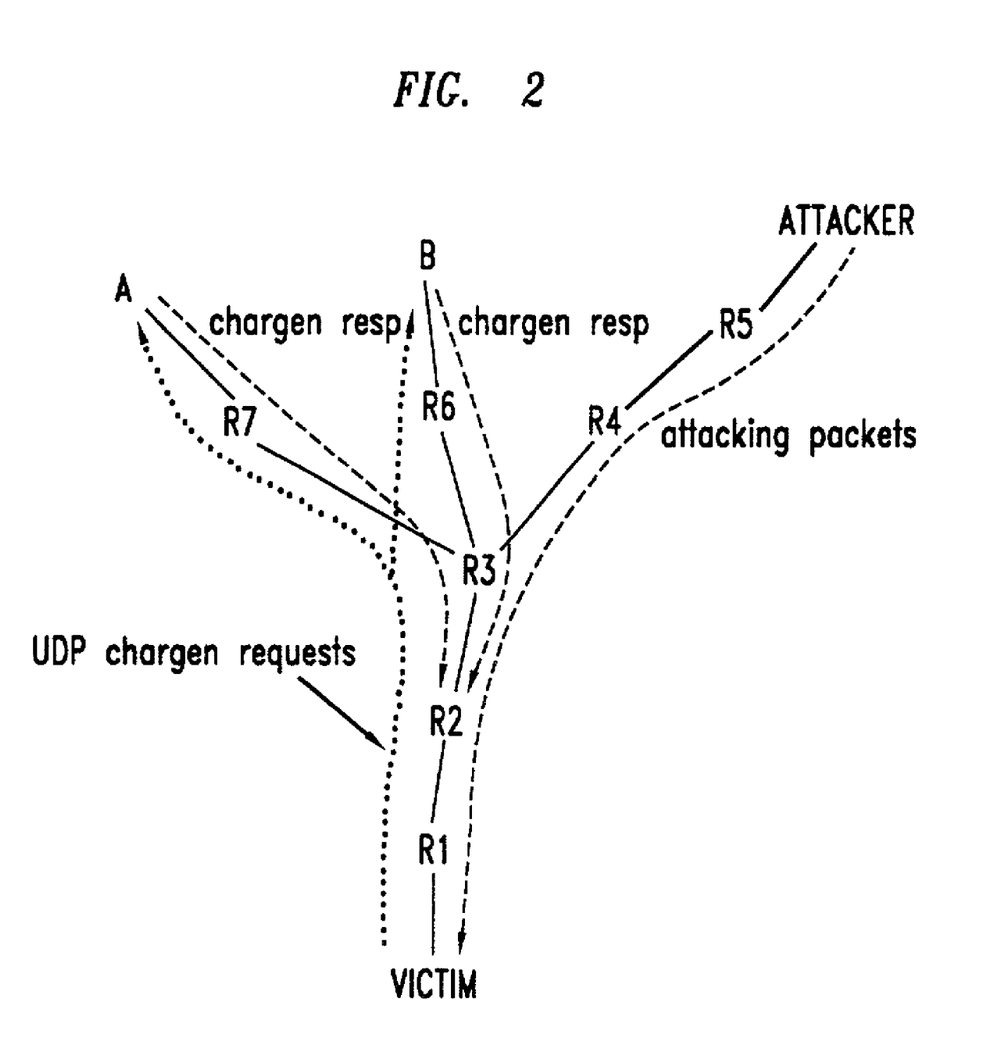
FIG. 2 shows an illustrative communications network arrangement and an illustrative example of the application of the illustrative method for tracing packets as shown in FIG. 1 thereto.

By way of example. FIG. 2 shows an illustrative communications network arrangement for analyzing and tracing packets to determine their source which may be used by the illustrative method shown in FIG. 1. Specifically, FIG. 2 shows a network consisting of nodes R1 through R7, A and B, in addition to nodes representative of an Attacker and a Victim. As shown, a stream of attacking packets is sent from the Attacker node to the Victim node. In accordance with the operation of an illustrative embodiment of the present invention, packets containing UDP chargen requests are sent to nodes A and B, spoofed from node R2, in order to initiate packet flows towards the victim. This, in turn, causes chargen response packets to be sent from each of nodes A and B back to node R2, thereby causing increased congestion along the link between R3 and R2, which, if sufficient, will induce a packet toss in the stream of attacking packets.

Additional Considerations and Alternative Illustrative Embodiments

Note that the effective execution of a trace advantageously involves significant preparation in the way of data collection. As such, and in accordance with one illustrative embodiment of the present invention, network data as well as traceroutes from the victim to all possible networks are advantageously collected. Due to asymmetric routes, directional data is advantageously collected and maintained by reverse traceroute servers or other means. Outbound paths are collected and it is assumed that the incoming paths are approximately the reverse of those paths. While this may not be completely accurate, by collecting the paths to all networks, it can be determined which links could be used on a path from a given network to the victim's network.

Because an illustrative embodiment of the present invention may wish to induce isolated loads on specific network segments that may not be in its purview, sources that will perform that task are advantageously identified. Since some ISPs are now quite regularly turning off the services that are exploited to induce these loads, cooperative hosts are advantageously identified at the right places in the network map in order to produce the desired load.

Note that this element of the technique constitutes a brief denial-of-service attack on the given network link. Hackers already employ bulk versions of such an approach for denial-of-service attacks. The technique of the present invention in accordance with certain illustrative embodiments thereof, on the other hand, advantageously limits the application of load to segments only long enough to rule them out as a possible component of the suspected path. In any case, recognizing the inherently "antisocial" aspect of this technique, it is expected that the principles of the present invention will be applied only in appropriate situations. Possible users include, inter alia, law enforcement agencies, the military. ISPs, and companies policing their own private intranets.

In accordance with certain illustrative embodiments of the present invention, even before attacks or victims are known, a trusted machine may advantageously develop and maintain a current database of networks and load generators. While one illustrative embodiment of the present invention executes the trace from the victim (i.e., targeted) network, a sufficiently complete map of the Internet generated in accordance with another illustrative embodiment of the invention allows a neutral third party to run the detecting utility, which, inter alia, allows flexibility in where to spread some of the bandwidth cost of the tool. In either case, the tracing machine advantageously emits packets that stimulate traffic flow through a desired router or link. In accordance with one illustrative embodiment of the present invention, a visual display of various statistics of the incoming packets on the victim's network may be employed to help a human operator determine if that link is used by the packets.

In accordance with some illustrative embodiments of the present invention, a human operator controls a (software) tool to probe links on the path back to the attacker—that is, the application of load is done manually. In accordance with other illustrative embodiments of the present invention, an algorithm is used to automate the procedure. In accordance with the human operator controlled embodiments, the operator may be advantageously supplied with information about the amount of load he or she is inflicting on networks. In this manner, for example, the operator can chose to stop using packet-source networks that have already generated a lot of load.

Note that if the induced load is sufficient to induce drops of incoming packets, it quickly and dramatically affects the attacking flow. However, the discomfort to ISPs and end users is advantageously brief enough that it likely to escape notice. If the load does not induce loss, it may be advantageous to run the load generators longer and seek more subtle effects on the workload. Note also that the technique of the present invention appears to work better when the network is already heavily loaded, although more subtle statistical effects may be detectable even when the Internet is relatively quiet.

Note that the successful application of the technique of the present invention implicitly relies on certain assumptions, but experience indicates that they are most often valid. First, it is assumed that most routes over the Internet are symmetric. Asymmetric routes may create confusion in the mapping, traceback and loading. However, in accordance with one illustrative embodiment of the present invention, the proliferation of reverse traceroute servers, which has proven quite useful for network diagnosis and debugging, might also advantageously facilitate construction of at least a partial directional map of routes.

It is also assumed that enough load can be generated on a particular Internet link to affect performance (in particular, loss) statistics of the stream of attacking packets. It is assumed that there is access to enough packet generators beyond the tested link to load it, which can be challenging across infrastructure with fast links and slower downstream networks. Techniques for doing this in accordance with certain illustrative embodiments of the present invention will be discussed below.

Note also that various complex behavior patterns may occur during the traceback—so in some situations, it may be advantageous to examine certain clues carefully. For example, in accordance with one illustrative embodiment of the present invention, a human operator might notice that an attacking stream drops by 33% in response to an applied load, rather than dropping off entirely. Such behavior might, for example, be consistent with two or three concurrent attacks from separate hosts. It may also be possible in such a case that the attacking stream is being load-balanced across three different links. Since only one packet stream may be traced at a time, it may be advantageous to be able to distinguish among the streams to perform the trace. For example, the operator might be able to use the arriving Time-to-live (TTL) value, assuming packets within each stream are launched with the same TTL value, and with each stream from different hop distances away. Conventional tools, familiar to those skilled in the art, are available to isolate such parameters, so such tools can be advantageously used if one of these parameters are sufficient to distinguish between streams.

Additional Details Concerning Various Illustrative Methods for Tracing Packets

As explained above and in accordance with an illustrative embodiment of the present invention, once the path to each network on the Internet has been determined, the traceback is performed by walking backwards through the resulting directed graph. The loading of a given link hopefully causes enough packet loss to result in a noticeable drop in the rate of attacking packets. If a significant drop occurs, it can be fairly certain that the tested link is on the path from the attacker to the victim. Otherwise, either the link is not on the path, or else not enough load (i.e., "pain") was provided to that link to result in a detectable packet loss. Note that since most links are full duplex, the link is advantageously loaded in the direction towards the victim.

This traceback requires making a high capacity link very busy for a short period of time, such as, for example, on the order of a second. It may be difficult to generate a flow of packets from a single host that will do this—it would ideally come from a fast host on a fast, unloaded link. It would therefore be preferred if there were some leverage (i.e., some "gain") on packets that are emitted. If a flow of x bits per second (bps) is sent out, for example, it would be advantageous if the resulting flow across the link were of kx bps, where k is greater than one and reasonably large.

To produce such a load, a series of messages, such as ICMP echo request (ping) packets (fully familiar to those of skill in the art), could be sent from the victim's network out to distant networks whose return path is expected to include the link that we wish to load. However, using ICMP echo request packets results in only one byte in return for every byte sent out, which is a gain of only 1. In addition, the return packets traverse the entire network back to the victim, which loads the entire set of links from the assistant network to the victim. This may obscure the data when attempting to determine the third link out. Sending ICMP echo requests from a separate network dedicated to this service may also be problematic, since the nature of Internet routing is such that it is difficult to ensure that their return path traverses the link we are testing.

Thus, in accordance with an illustrative embodiment of the present invention, instead of sending packets from the victim's network, spoofed packets are advantageously sent from a test host located elsewhere on the network. When testing a particular link, probe packets are advantageously sent to the router on the far end of the link, using as a return address the router on the near end of the link. The near router will typically discard the unsolicited replies (if using TCP, it actually may reset; for UDP, it may reply with a ICMP Port Unreachable).

Note however that many routers make special efforts to put rate limits on handling of ICMP echo requests, since they are used so often. Moreover, the gain of 1 does not help us much anyway. Thus, in accordance with an illustrative embodiment of the present invention, a different service is advantageously used in order to supply the load, in particular the (often forgotten) tiny service TCP character generator (chargen), fully familiar to those skilled in the art. This service advantageously generates continuous data to anyone who connects to it, which is exactly what is useful in the context of the present invention. The rate of data flow is limited in general by the rate that the data is acknowledged by the client machine. Thus, at the cost of a few TCP ACKs, a steady stream of data can be advantageously coaxed out of a site supporting this service. Several of these routed over the target link will generate substantial load. In accordance with one illustrative embodiment of the present invention, the TCP ACKs are advantageously used to pulse all the transmitters to provide a fine burst of load by ACK-ing several open chargen sockets simultaneously. Note that even though TCP chargen is turned off on many of the Internet's hosts and routers, there are nonetheless many that do run the service, and they are easy to find.

Note the existence of two issues—the TCP processing on the local host may slow such a chargen stream down more than would be desirable, and, more importantly, the chargen stream still must traverse the path all the way back to the sender, unless TCP sequence guessing and IP spoofing is attempted. Unfortunately, this may in some cases be difficult. The second problem can be circumvented by using UDP chargen instead of TCP and by spoofing the packets, but this approach provides little gain. (For example, it has been determined that approximately 102 bytes are gotten back for 40 bytes sent, a gain of only 2.55, when 12 of data have been included in the sent packets to give information about their actual source.) The chargen RFC specifies that the return packet should have between 0 and 512 bytes of data (not counting the 28 bytes for the IP and UDP headers). It has violate this standard and can return up to 6,000 bytes in response to a single packet, a gain of 150!

Note that a spoofed ICMP echo request to a broadcast address can yield gain as well. By locating networks "beyond" the link and sending directed broadcast ICMP echo requests thereto, a gain of one can be achieved for each host on that network which responds. Unfortunately, many routers process broadcast ICMP echo requests in such a way that only the router itself returns a packet. This is, of course, fortunate for the potential victims of broadcast ICMP echo request attacks, and is, in fact, recommended for that reason. However, it limits broadcast ICMP echo request's usefulness in the context of the present invention. However, such routers do let other broadcast traffic through, and it has been determined that gains in excess of 200 can be advantageously obtained quite often using broadcast UDP chargen packets in accordance with an illustrative embodiment of the present invention.

When the load is initiated, the goal in accordance with the principles of the present invention is to load one line or, possibly, one router. It is certainly not desirable to load the entire path back to the victim. In accordance with an illustrative embodiment of the present invention, this may be advantageously prevented in two different ways. First, as mentioned above, the return address of the UDP chargen packets is spoofed to be the address of the router on the victim's side of the link. Second, multiple UDP chargen hosts are advantageously utilized. To test a link, networks that reside behind the link, as seen from the victim, are selected. In particular, networks that have hosts that respond to UDP chargen broadcast packets are selected. A network is selected for each outbound link from the far router of the line we are testing. This strategy focuses the load on the line under examination—the packets advantageously travel to the machine over different lines, hopefully not affecting each other significantly. (Again, note that Internet routing is not inconsistent with their having traversed a common link previously in the path, although it is unusual.) The load is advantageously limited by the lines that the load must traverse, the speed of the networks where the load is being generated, or the ability to emit UDP chargen request packets in the first instance.

In various experiments which have been performed, the average gain seen was approximately 133.8. In these experiments, and in accordance with one illustrative embodiment of the present invention, 2,500 40 byte packets were generated per second for a rate of 800 kbps. Note that to flood a 10 Mbps Ethernet only requires a gain of 12.5 at that rate. Similarly, at 800 kbps, to flood a 100 Mbps Ethernet requires a gain of 125; to flood a T1 line requires a gain of 1.9; and to flood a T3 line requires a gain of 56. In order to flood a backbone link, such as an OC-12, OC-48 or OC-192, however, one needs gains of 777, 3110, and 12,441, respectively, at the 800 kbps rate. But note that when loading backbone links, the rest of the traffic that is traversing those links helps considerably, and so the actual amount of traffic required to start packet loss is much less than that represented by the given gain number. Moreover, in accordance with one illustrative embodiment of the present invention, the rate of outbound packets may advantageously be greatly increased by using multiple computers that connect to the Internet over different links.

Note also that these numbers are approximate, since some of those 2,500 generated packets will most likely be dropped. In addition, in accordance with one illustrative embodiment of the present invention, 28 byte packets could be used instead of 40 byte packets, although it is not clear whether they could be transmitted more quickly.

The illustrative embodiments of the present invention which have been discussed so far advantageously loads the actual lines. In accordance with other illustrative embodiments of the present invention, the router is advantageously loaded. Diverting packet flow by sending a message directly to a router may be difficult, as Internet backbone routers ignore various ICMP messages to redirect or stifle packet flow. Most conventional methods for loading a router have to tackle its system configuration to limit return data flow. Router designs also typically have almost all forwarding handled by a simple machine that just delegates difficult tasks to a higher layer. Less legitimate options, such as hijacking BGP sessions or breaking into the router itself, although quite malicious, could nonetheless be used, at least in theory.

There are other possibilities on ways to slow routers, however. One option in accordance with one illustrative embodiment of the present invention is to ping flood the router—i.e., to send it ICMP echo requests as fast as possible. A similar alternative in accordance with other illustrative embodiments of the present invention is to send the router a flood of packets whose Time-to-live (TTL) value expires at the desired hop along the path, or, alternatively, to transmit a stream of UDP packets to high ports to stimulate responding UDP port unreachables. Since most routers seem to rate-limit UDP port unreachable messages, however, this latter approach may have limited usefulness.

And finally, in accordance with still other illustrative embodiments of the present invention, one can spew packets at the router to try and upset its routing table. That is, find some sort of packet it responds regularly to (TTL exceeded, echo request) and send it a bunch of packets with random return addresses. Coping with the packets will advantageously require enough attention to unsettle the route table cache. In order to combat the incoming stream, it may be useful to pick a handful of sources and cycle through them.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts (e.g., FIG. 1) may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

We claim:

1. A method for tracing a sequence of packets to a potential source thereof within a communications network, the sequence of packets being received at a target host in said communications network at a received packet rate, the method comprising the steps of:
  (a) identifying a plurality of network elements comprised in said communications network;
  (b) applying a burst load to a selected one of said identified network elements in said communications network;
  (c) measuring a change in said received packet rate in response to said application of said burst load to said selected network element;
  (d) including said selected network element in a potential path if said change in said received packet rate fails to meet a predetermined criterion; and
  (e) repeating steps (b), (c) and (d) on other selected network elements a plural number of times to generate a path leading from said target host to said potential source based on the selected network elements which have been included in said potential path.

2. The method of claim 1 wherein said communications network comprises the Internet.

3. The method of claim 1 wherein each of said selected network elements comprises a network link.

4. The method of claim 3 wherein said step of applying a burst load to said network link comprises transmitting packets to a subnetwork of said communications network to initiate a responsive flow of packets through said network link.

5. The method of claim 4 wherein said transmitted packets are spoofed from an end of said network link closest to said target host.

6. The method of claim 4 wherein said transmitted packets comprise UDP chargen requests.

7. The method of claim 1 wherein each of said selected network elements comprises a network router.

8. The method of claim 1 further comprising the step of generating a map comprising routes from said target host to a plurality of subnetworks of said communications network.

9. The method of claim 1 further comprising the step of eliminating said selected network element from consideration as said potential source of said sequence of packets when said change in said received packet rate meets the predetermined criterion.

10. The method of claim 1 wherein said predetermined criterion comprises a determination of whether said change in said received packet rate is less than a predetermined threshold.

11. The method of claim 9 wherein said step of eliminating said selected network element from consideration also eliminates from consideration one or more subnetworks of said communications network which are connected to said selected network element.

12. The method of claim 1 wherein said sequence of packets comprises a Denial-of-Service attack on said target host.

13. The method of claim 1 wherein said steps of applying said burst load, measuring said changes in said received packet rate, and determining said potential source of said sequence of packets, are executed under the control of an automated algorithm.

14. The method of claim 1 wherein said steps of applying said burst load and determining said potential source of said sequence of packets, are executed under the at least partial control of a human operator.

15. The method of claim 14 further comprising the step of displaying information, said information including data representative of said measured changes in said received packet rate, to said human operator, for use by said human operator in exercising said at least partial control.

16. An apparatus for tracing a sequence of packets to a potential source thereof within a communications network, the sequence of packets being received at a target host in said communications network at a received packet rate, the apparatus comprising:
  (a) means for identifying a plurality of network elements comprised in said communications network;
  (b) means for applying a burst load to a selected one of said identified network elements in said communications network;
  (c) means for measuring changes in said received packet rate in response to said application of said burst load to said selected network elements;
  (d) means for including said selected network element in a potential path if said change in said received packet rate fails to meet a predetermined criterion; and
  (e) means for repeating an operation of means (b), (c) and (d) on other selected network elements a plural number of times to generate a path leading from said target host to said potential source based on the selected network elements which have been included in said potential path.

17. The apparatus of claim 16 wherein said communications network comprises the Internet.

18. The apparatus of claim 16 wherein each of said selected network elements comprises a network link.

19. The apparatus of claim 18 wherein said means for applying a burst load to said network link comprises means for transmitting packets to a subnetwork of said communications network to initiate a responsive flow of packets through said network link.

20. The apparatus of claim 19 wherein said transmitted packets are spoofed from an end of said network link closest to said target host.

21. The apparatus of claim 19 wherein said transmitted packets comprise UDP chargen requests.

22. The apparatus of claim 16 wherein each of said selected network elements comprises a network router.

23. The apparatus of claim 16 further comprising means for generating a map comprising routes from said target host to a plurality of subnetworks of said communications network.

24. The apparatus of claim 16 further comprising means for eliminating said selected network element from consideration as said potential source of said sequence of packets when said change in said received packet rate meets the predetermined criterion.

25. The apparatus of claim 16 wherein said predetermined criterion comprises a determination of whether said change in said received packet rate is less than a predetermined threshold.

26. The apparatus of claim 24 wherein said means for eliminating said selected network element from consideration also eliminates from consideration one or more subnetworks of said communications network which are connected to said selected network element.

27. The apparatus of claim 16 wherein said sequence of packets comprises a Denial-of-Service attack on said target host.

28. The apparatus of claim 16 wherein said means for applying said burst load, said means for measuring said changes in said received packet rate, and said means for determining said potential source of said sequence of packets, are executed under the control of an automated algorithm.

29. The apparatus of claim 16 wherein said means for applying said burst load and said means for determining said potential source of said sequence of packets are executed under the at least partial control of a human operator.

30. The apparatus of claim 29 further comprising means for displaying information, said information including data representative of said measured changes in said received packet rate, to said human operator, for use by said human operator in exercising said at least partial control.

* * * * *